(12) United States Patent
Tione

(10) Patent No.: US 12,311,949 B2
(45) Date of Patent: *May 27, 2025

(54) VEHICLE CONTROL SYSTEM

(71) Applicant: FAIVELEY TRANSPORT ITALIA S.P.A., Piossasco (IT)

(72) Inventor: Roberto Tione, Lauriano (IT)

(73) Assignee: Faiveley Transport Italia S.P.A., Piossasco (Torino) (IT)

( * ) Notice: Subject to any disclaimer, the term of this patent is extended or adjusted under 35 U.S.C. 154(b) by 136 days.

This patent is subject to a terminal disclaimer.

(21) Appl. No.: 18/072,638

(22) Filed: Nov. 30, 2022

(65) Prior Publication Data

US 2023/0090923 A1   Mar. 23, 2023

Related U.S. Application Data

(63) Continuation-in-part of application No. 16/990,191, filed on Aug. 11, 2020, now Pat. No. 11,529,982, (Continued)

(30) Foreign Application Priority Data

Apr. 5, 2016   (IT) .................. 102016000034535

(51) Int. Cl.
   *B60W 30/18*  (2012.01)
   *B60W 30/02*  (2012.01)
   *B60W 50/06*  (2006.01)

(52) U.S. Cl.
   CPC ...... *B60W 30/18172* (2013.01); *B60W 30/02* (2013.01); *B60W 50/06* (2013.01); *B60W 2520/26* (2013.01); *B60W 2520/28* (2013.01)

(58) Field of Classification Search
   CPC . B60T 1/10; B60T 8/174; B60T 8/176; B60T 8/321; B60T 13/586;
   (Continued)

(56) References Cited

U.S. PATENT DOCUMENTS

| | | |
|---|---|---|
| 5,424,948 A | 6/1995 | Jordan, Jr. |
| 6,152,546 A | 11/2000 | Daigle |

(Continued)

FOREIGN PATENT DOCUMENTS

| | | | | |
|---|---|---|---|---|
| AU | 2014402646 A1 | * | 2/2017 | ............ B60K 17/35 |
| AU | 2021100450 A4 | * | 6/2021 | |

(Continued)

OTHER PUBLICATIONS

Ribeiro, et al., Estimation of Tire-Road Friction for Road Vehicles: a Time Delay Neural Network Approach; Neural and Evolutionary Computing (cs.NE); Systems and Control (eess.SY); (https://doi.org/10.48550/arXiv.1908.00452) (Year: 2019).*

(Continued)

*Primary Examiner* — Atul Trivedi
(74) *Attorney, Agent, or Firm* — K&L Gates LLP

(57) ABSTRACT

A vehicle control system may be provided for controlling adhesion of wheels to a route surface. The control system includes one or more processors configured to determine adhesion values representative of adhesion between the wheels of a vehicle and the route surface based on angular speeds of the wheels. An artificial intelligence neural network may generate a target slip value for the wheels that are coupled with at least two different axles of the vehicle by processing the adhesion values and modifying the target slip value to increase an average value of the adhesion values of the wheels. The one or more processors may control a torque applied to at least one of the axles based on the target slip value.

20 Claims, 10 Drawing Sheets

Related U.S. Application Data which is a continuation-in-part of application No. 16/090,362, filed as application No. PCT/IB2017/051887 on Apr. 3, 2017, now Pat. No. 10,780,904.

(58) Field of Classification Search
CPC ............. B60T 2210/124; B60W 30/02; B60W 30/18172; B60W 50/06; B60W 2520/26; B60W 2520/28; B61L 15/0081; F16D 61/00
USPC .......................................................... 701/20
See application file for complete search history.

(56) References Cited

U.S. PATENT DOCUMENTS

| | | | |
|---|---|---|---|
| 6,208,087 B1 | 3/2001 | Hughes et al. | |
| 6,236,954 B1 | 5/2001 | Thomas et al. | |
| 7,027,900 B2 | 4/2006 | Kumar et al. | |
| 10,387,794 B2 * | 8/2019 | Okanohara | G06N 20/00 |
| 10,780,904 B2 | 9/2020 | Tione | |
| 11,529,982 B2 | 12/2022 | Tione | |
| 11,643,068 B1 * | 5/2023 | Wittenschlaeger | B60C 23/002 701/22 |
| 2005/0189886 A1 | 9/2005 | Donnelly et al. | |
| 2005/0189887 A1 * | 9/2005 | Donnelly | B61C 15/14 318/52 |
| 2006/0273657 A1 | 12/2006 | Wanke et al. | |
| 2007/0001629 A1 | 1/2007 | McGarry et al. | |
| 2008/0103011 A1 | 5/2008 | Gleasman et al. | |
| 2008/0116739 A1 | 5/2008 | Lang | |
| 2008/0137062 A1 | 6/2008 | Holton et al. | |
| 2008/0319611 A1 | 12/2008 | Song | |
| 2009/0186535 A1 * | 7/2009 | Sullivan | B60F 3/0007 440/12.66 |
| 2010/0324766 A1 | 12/2010 | Linda et al. | |
| 2011/0060487 A1 * | 3/2011 | Jess | B60K 28/165 180/65.265 |
| 2012/0277940 A1 | 11/2012 | Kumar et al. | |
| 2013/0082626 A1 | 4/2013 | Daigle et al. | |
| 2013/0103279 A1 | 4/2013 | Asano | |
| 2013/0238176 A1 | 9/2013 | Watanabe et al. | |
| 2013/0320900 A1 | 12/2013 | Daigle | |
| 2014/0039767 A1 | 2/2014 | Jensen | |
| 2014/0074328 A1 | 3/2014 | Schaffler | |
| 2014/0297141 A1 | 10/2014 | Nihanda et al. | |
| 2015/0045988 A1 * | 2/2015 | Gusikhin | G07C 9/00571 701/2 |
| 2016/0003408 A1 | 1/2016 | Stuble | |
| 2016/0010574 A1 | 1/2016 | Kumar et al. | |
| 2016/0046287 A1 * | 2/2016 | Owen | B60W 10/04 701/43 |
| 2016/0185350 A1 * | 6/2016 | Kelly | B60W 10/04 701/94 |
| 2016/0264019 A1 | 9/2016 | Drako | |
| 2017/0023114 A1 | 1/2017 | Wang et al. | |
| 2018/0281759 A1 | 10/2018 | Rasel et al. | |
| 2018/0319404 A1 * | 11/2018 | Jonasson | B60W 10/18 |
| 2019/0111787 A1 | 4/2019 | Tione | |
| 2019/0111932 A1 * | 4/2019 | Falconer | B60W 30/18045 |
| 2019/0248370 A1 * | 8/2019 | Cunningham | B60W 30/18018 |
| 2020/0369305 A1 | 11/2020 | Tione | |
| 2021/0031785 A1 * | 2/2021 | Oh | B60W 50/10 |
| 2021/0086623 A1 | 3/2021 | Yao et al. | |
| 2022/0185293 A1 * | 6/2022 | Choi | B60W 40/109 |
| 2023/0242121 A1 * | 8/2023 | Salif | B60T 8/1764 701/70 |
| 2024/0116512 A1 * | 4/2024 | Engels | B60W 30/182 |
| 2024/0123995 A1 * | 4/2024 | Yoon | B60W 50/10 |
| 2024/0132054 A1 * | 4/2024 | Weston | B60W 30/02 |

FOREIGN PATENT DOCUMENTS

| | | | | |
|---|---|---|---|---|
| CA | 2819349 A1 * | 6/2012 | ............. | B62D 5/001 |
| CN | 1845842 A | 10/2006 | | |
| CN | 101213104 A | 7/2008 | | |
| CN | 101557958 A | 10/2009 | | |
| CN | 106444373 A | 2/2017 | | |
| CN | 104554274 B * | 12/2017 | ............. | B60T 8/172 |
| CN | 108507940 A * | 9/2018 | ......... | B60W 40/068 |
| CN | 112277929 A * | 1/2021 | ............. | B60W 30/02 |
| CN | 115742756 A * | 3/2023 | | |
| EP | 1627790 A1 * | 2/2006 | ............. | B60T 8/172 |
| EP | 1935732 A1 | 6/2008 | | |
| EP | 2147840 A1 | 1/2010 | | |
| EP | 2865572 A1 * | 4/2015 | ............. | B60T 8/172 |
| FR | 2923423 A1 * | 5/2009 | ............. | B60L 3/102 |
| GB | 2593794 A * | 10/2021 | ............. | B63B 43/18 |
| WO | 2006113954 A1 | 2/2006 | | |
| WO | 2015136117 A1 | 9/2015 | | |
| WO | 2017175108 A1 | 10/2017 | | |
| WO | WO-2021260910 A1 * | 12/2021 | | |

OTHER PUBLICATIONS

Z. Han, W. Liu, Z. Gao and D. Liu, "A Method for Real-time Road Surface Identification of Intelligent Tire Systems Based on Random Convolutional Kernel Neural Network," in IEEE Transactions on Intelligent Vehicles, doi: 10.1109/TIV.2024.3369951. (https://ieeexplore.ieee.org/document/10452818) (Year: 2024).*

Leng, et al., "Tire-Road Peak Adhesion Coefficient Estimation Method Based on Fusion of Vehicle Dynamics and Machine Vision," in IEEE Transactions on Intelligent Transportation Systems, vol. 23, No. 11, pp. 21740-21752, Nov. 2022, https://ieeexplore.ieee.org/document/9802509 (Year: 2022).*

Ribeiro, et al., "Estimation of Tire-Road Friction for Road Vehicle: a Time Delay Neural Network Approach; Neural and Evolutionary Computing (cs.NE); Systems and Control (eess.SY)"; (https://doi.org/10.48550/arXiv.1908.00452) (Year: 2019).*

Han, et al., "A Method for Real-time Road Surface Identification of Intelligent Tire Systems Based on Random Convolutional Kernel Neural Network," in IEEE Transactions on Intelligent Vehicles, doi: 10.1109/TIV.2024.3369951 (https://ieeexplore.ieee.org/document/10452818) (Year: 2024).*

Leng, et al., "Tire-Road Peak Adhesion Coefficient Estimation Method Based on Fusion of Vehicle Dynamics and Machine Vision," in IEEE Transactions on Intelligent Transportation Systems, vol. 23, No. 11, pp. 21740-21751 (https://ieeexplore.ieee.org/document/9802509) (Year: 2022).*

Jin, et al.; "Tire-road friction estimation and traction control strategy for motorized electric vehicle"; 2017; PubMedCentral; pp. 1-18; https://www.ncbi.nlm.nih.gov/pmc/articles/PMC5491023/ (Year: 2017).

Amodeo, et al.; "Wheel Slip Control via Second-Order Sliding-Mode Generation"; 201 O; IEEE Transactions on Intelligent Transportation Systems; vol. 11, No. 1; pp. 122-131; https://ieeexplore.ieee.org/document/5340526 (Year: 2010).

Widrow et al., Adaptive Signal Processing, New Jersey, Prentice-Hall, Inc., 1985.

International Search Report and Written Opinion for corresponding PCT/IB2016/057813, dated Apr. 5, 2017.

* cited by examiner

VEHICLE CONTROL SYSTEM

CROSS-REFERENCE TO RELATED APPLICATIONS

This application is a continuation-in-part of U.S. patent application Ser. No. 16/990,191, filed on 11 Aug. 2020, which is a continuation-in-part of U.S. patent application Ser. No. 16/090,362, filed on 1 Oct. 2018 (now U.S. Pat. No. 10,780,904), and which is a national stage application, filed pursuant to 35 U.S.C. § 371, of International Patent Application No. PCT/IB2017/051887, filed 3 Apr. 2017, which claims priority to Italian Patent Application No. 102016000034535, filed on 5 Apr. 2016. The entire disclosures of these applications are incorporated herein by reference.

BACKGROUND

Technical Field

Embodiments are disclosed herein that relate to controlling adhesion of wheels of a vehicle.

Discussion of Art

Wheels of a vehicle may slip on roads, tracks, or the like, when adhesion between the wheels and the surfaces of the roads, tracks, or the like, decreases. With respect to rail vehicles, electronic systems may be installed onboard modern rail vehicles that may include wheel slide control subsystems. These subsystems may be adapted to intervene both when the vehicle is in the traction phase and when the vehicle is in the braking phase. These subsystems can be referred to as anti-skid or anti-slide systems, or also WSP (Wheel Slide Protection) systems. However, the wheel slide control subsystems may not be able calculate and implement a target slip value between the wheels of the vehicle and the surface based on current conditions.

It may be desirable to have a system and method that differs from those that are currently available.

BRIEF DESCRIPTION

In one embodiment, a vehicle control system may be provided for controlling adhesion of wheels to a route surface. The control system may include one or more processors that can determine adhesion values representative of adhesion between the wheels of a vehicle and the route surface based on angular speeds of the wheels. The system may include an artificial intelligence (AI) neural network that may have artificial neurons arranged in layers and connected with each other by connections. The AI neural network may subsequently calculate a target slip value for the wheels that may be coupled with at least two different axles of the vehicle by using the adhesion values that were determined. The AI neural network may repeatedly modify the target slip value to increase an average value of the adhesion values of the wheels. The one or more processors may control a torque applied to at least one of the axles based on the target slip value that may be calculated. The AI neural network may receive feedback regarding the target slip value that may be calculated and modified by the artificial neurons. The AI neural network may be trained by changing one or more connections between the artificial neurons in the AI neural network based on the feedback that may be received.

In one embodiment, a method for controlling adhesion of wheels of a vehicle may include determining adhesion values representative of adhesion between wheels of a vehicle and a route surface based on angular speeds of the wheels and determining a target slip value for the wheels that may be coupled with at least two different axles of the vehicle. The target slip value may be determined based on the adhesion values that may be determined. The target slip value may be calculated using an AI neural network having artificial neuron arranged in layers and connected with each other by connections. The method also may include controlling a torque applied to at least one of the axles based on the target slip value and changing the target slip value as the vehicle moves based on changes in the adhesion values to increase an average value of the adhesion values. The changing of the target slip values may be done using the AI neural network. The method may include receiving feedback regarding the target slip value that may be calculated and changed by the artificial neurons and training the AI neural network by changing one or more connections between the artificial neurons in the AI neural network based on the feedback that may be received.

In one embodiment, a system for controlling adhesion of wheels of a vehicle may include one or more processors configured to determine adhesion values representative of adhesion between wheels of a vehicle and a route surface based on angular speeds of the wheels. The system may include an AI neural network having artificial neurons arranged in layers and connected with each other by connections. The AI neural network may calculate a target slip value for the wheels that may be coupled with at least two different axle of the vehicle using the adhesion values that were determined. The AI neural network may repeatedly change the target slip value as the vehicle moves based on changes in the adhesion values to increase an average value of the adhesion value. The artificial neurons may receive feedback regarding the target slip value that may be calculated, and the AI neural network may be trained by changing one or more connections between the artificial neurons in the AI neural network based on the feedback that may be received. The one or more processors may control a torque applied to at least one of the axles based on the target slip value and may change the target slip value as the vehicle moves based on changes in the adhesion values to increase an average value of the adhesion values. The wheels may include a leading wheel and a trailing wheel along a direction of movement of the vehicle. The AI neural network may increase the target slip value associated with the leading wheel to clean the route surface with the leading wheel prior to travel of the trailing wheel.

The change to the target slip value can include repeatedly changing the target slip value based on a sampling time of the system such that one or more intervals of time may exist between changes to the target slip value. The average value of the adhesion values can be increased by increasing the average value to a designated or upper limit, where this limit can be less than a theoretical potential adhesion. For example, the increased average value of adhesion may be an adhesion value that prevents the wheels from slipping but is less than a largest possible value of adhesion.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
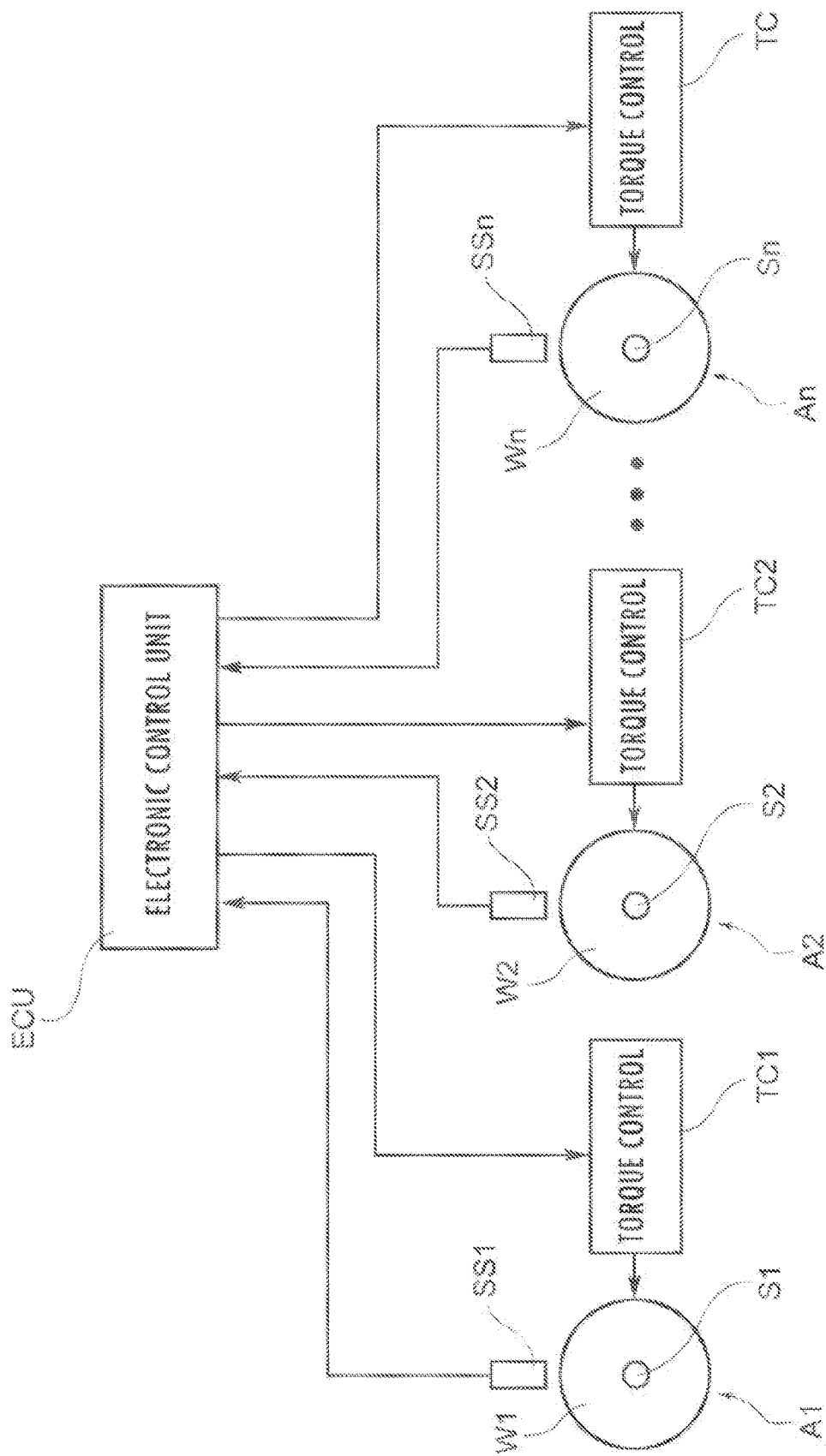
FIG. 1 is a block diagram of an anti-skid control system of the wheels of a vehicle.

One example a system for controlling the adhesion of the wheels may be schematically represented in FIG. 1 of the accompanying drawings. This Figure illustrates a vehicle with n controlled axles A1, A2, . . . , An. The axles may comprise a respective shaft S1, S2, . . . , Sn and a respective pair of wheels W1, W2, . . . , Wn integral in rotation to the shaft. In the drawings, generally only one wheel of each axle may be illustrated. The WSP system of FIG. 1 may include an electronic control unit ECU, typically based on microprocessor architecture, that receives tachometer signals relating to the angular speed of each axle from sensors SS1, SS2, . . . , SSn respectively associated to these axles. The electronic control unit ECU may be connected to the torque control apparatuses TC1, TC2, . . . , TCn, each associated to a respective axle.

The electronic control unit ECU may be provided to operate a modulation of the torque applied to each axle according to a predetermined algorithm if, in the case of applying torque during traction or braking phase in a degraded adhesion situation, the wheels of one or more axles end up in a possible incipient slipping condition. Torque modulation may be implemented in such a way as to prevent a total locking of the axles, possibly to bring each axle into a situation of controlled slipping in view of recovering adhesion and in any case for the entire duration of the degraded adhesion situation. The ECU may include an artificial intelligence (AI) or machine learning system based on the predetermined algorithm, as discussed further herein.

Figure 2:
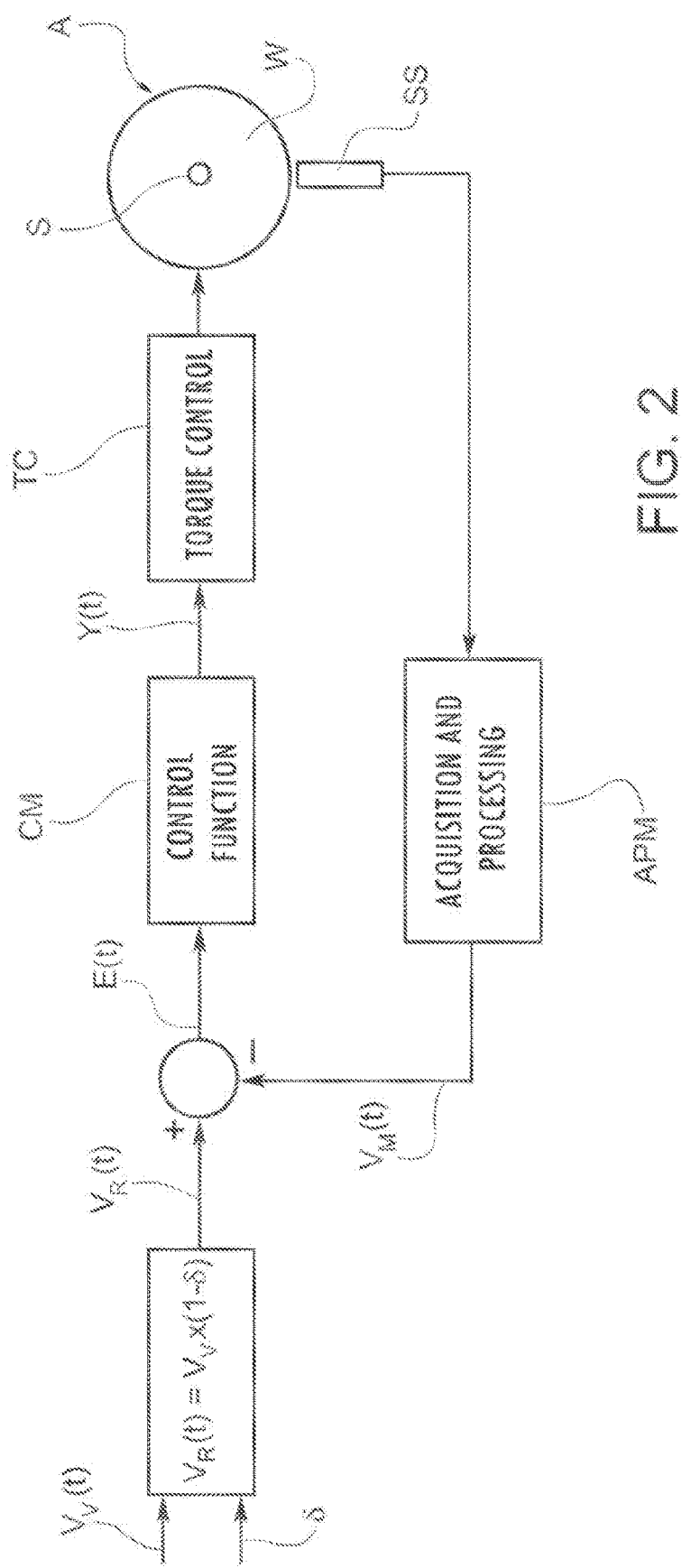
FIG. 2 is a block diagram of a closed loop control system of an axle's rotation speed.

FIG. 2 shows a block diagram illustrating an adhesion control/recovery system for an axle. The error or difference E(t) between the reference speed value VR(t) at which one wishes to slide the controlled axle A and the measured speed VM(t) detected by the associated sensor SS and conditioned by an acquisition and processing module APM may be applied as an input signal to a control module CM, which outputs a drive signal Y(t) to the torque control apparatus TC associated with the axle. The reference velocity VR(t) may be obtained as a fraction of the instantaneous speed of the vehicle, for example, according to the expression:

$$V_s(t) = V_v(t) \cdot (1-\delta) \quad (1)$$

where $V_v(t)$ may be the instantaneous (detected) speed of the vehicle, δ represents the relative slip of the axle A to be obtained during the slipping phase. The optimization over time of the relative slip value δ represents one of the objects of the inventive subject matter described herein.

Figure 3:
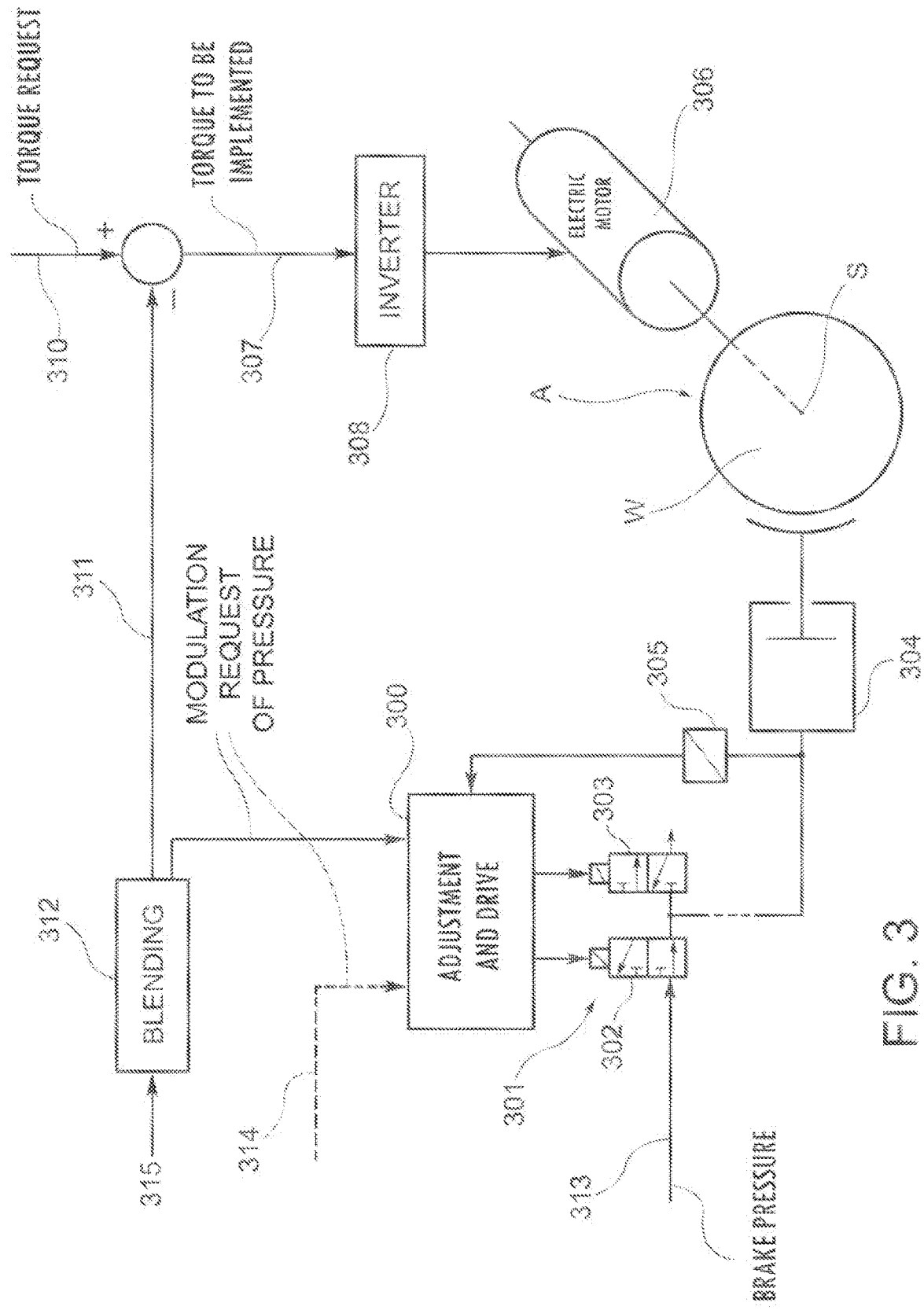
FIG. 3 is a diagram of a possible embodiment of an apparatus for controlling the torque applied to an axle.

FIG. 3 illustrates a possible embodiment of the torque control apparatus TC, according to one example. Such apparatus comprises an electronic adjustment and drive unit 300, which may control a solenoid valve unit 301 including a charging solenoid valve 302 and a discharging solenoid valve 303. In the embodiment illustrated, these solenoid valves may be three-way valves with two positions. The solenoid valve may be normally open, and the solenoid valve may be normally closed. The output of the charging solenoid valve may be coupled to a brake cylinder 304 associated to the axle.

Under the control of the electronic unit, the valve unit may be allowed to selectively reduce, maintain, or increase the command pressure supplied to the brake cylinder within values comprised between the atmospheric pressure and the braking pressure coming from a conduit 313 connected to the charging solenoid valve. The unit may be predisposed to control the pressure to the brake cylinder in an open loop, and may delegate the closure of the control loop to a speed loop according to FIG. 2, or may control the pressure in a closed loop through a feedback achieved through the use of a pressure sensor 305.

An electric motor 306 may be associated with the axle and may be able to apply to such axle a traction or braking torque in accordance with a request for torque 307 applied to an inverter 308 that drives the electric motor. The torque to be applied to the axle by the motor may correspond to a torque request 310, and may be modified by a correction torque 311, which may be variable between zero and the value of the torque. The torque may be positive in case of traction and may be negative in case of braking.

A blending module 312, in case of slipping during braking, may blend the torque modulation request applied to the axle between the pneumatic system and the regenerative electrodynamic system, according to a predetermined manner. The torque control apparatus illustrated in FIG. 3 may be realized according to many variants. For example, in the case of hauled railway vehicles, or those satisfying UIC regulations, which typically have pneumatic-type anti-slip systems completely isolated from the traction systems, the unit may not driven by the blending module through a modulation request 313, as may be illustrated in FIG. 3, but rather may be driven directly by the control module of FIG. 2 through a torque modulation request 314 illustrated with a dashed line in FIG. 3. Additionally, while one or more embodiments may be described herein in relation to rail vehicles, not all embodiments may be limited to rail vehicles. One or more embodiments may be used with other types of vehicles, such as automobiles, trucks, buses, agricultural vehicles, mining vehicles, other off-highway vehicles, etc.

The adhesion coefficient μ(δ) between wheels and surfaces of routes, tracks, etc. (e.g., route surfaces) can vary according to the slip δ substantially in the way illustrated in FIG. 4. Based on the expression (1) above, δ may be expressed as $$\delta = \frac{Vv - Vr}{Vv} \quad (1')$$

with 0≤Vr≤Vy and 0≤δ≤1.

Figure 4:
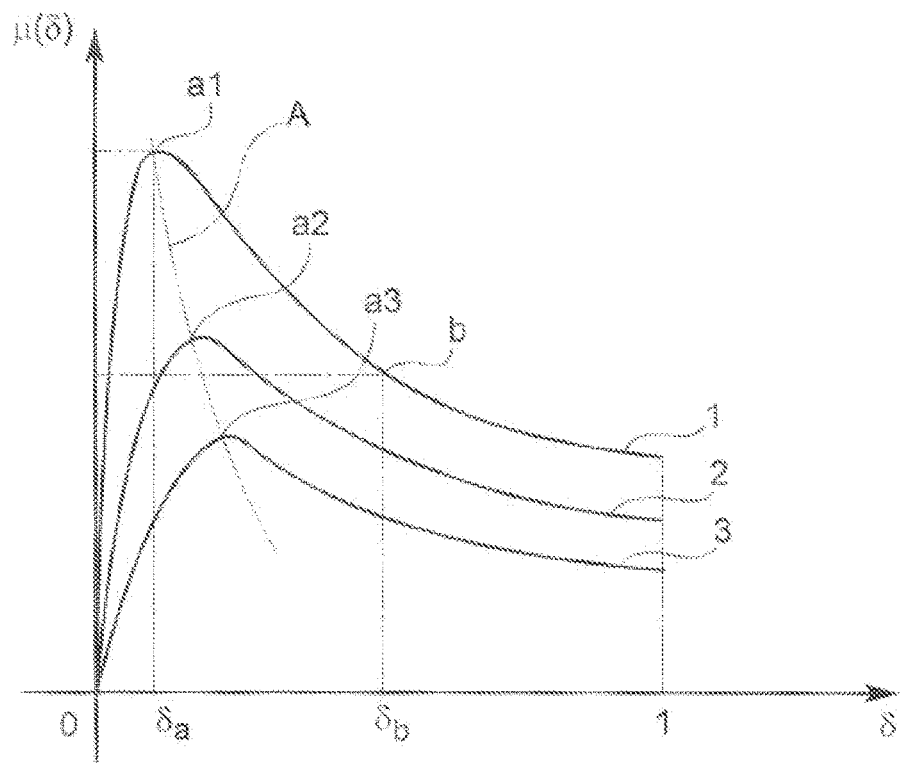
FIG. 4 is a graph showing qualitatively the trend of the adhesion coefficient t of the wheels of an axle, shown on the y-axis, as a function of the slip δ, shown on the x-axis.

In FIG. 4, the curves 1, 2, and 3 may qualitatively represent the trend of the adhesion according to the environmental conditions: curve 1 may correspond to an adhesion condition in dry contact conditions between the wheels and route surfaces, curve 2 may correspond to an adhesion condition in the presence of moisture between the wheels and route surfaces, and curve 3 may represent an adhesion condition in the presence of viscous material between the wheels and route surfaces, such as oil or rotten leaves (typical condition in the autumn period), or even rust mixed with moisture (typical condition in railway depots, garages, etc.).

It has been found experimentally that the values of δ at the adhesion peaks a1, a2, a3 may change on varying of the adhesion conditions, moving along a curve as indicated with A in FIG. 4.

Figure 5:
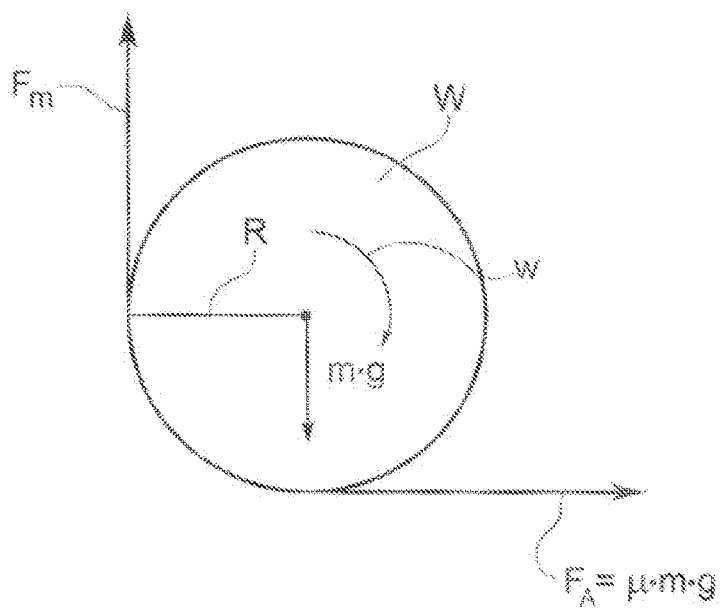
FIG. 5 is a diagram illustrating the forces applied to an axle's wheel.

FIG. 5 is a diagram illustrating forces applied to a wheel of an axle. From this figure, it may be shown that:

$$F_m \cdot R = F_A \cdot R - J \cdot \dot{\omega} \quad (2)$$

where:

$$F_A = \mu \cdot m \cdot g \quad (3)$$

for which:

$$F_m = \mu \cdot m \cdot g - J/R \cdot \dot{\omega} \quad (4)$$

where $F_m$ may be the tangential force applied to a wheel by the traction and/or braking system, R may be the radius of the wheel, J may be the axle's moment of inertia, m may be the mass applied to the wheel-rail contact point, $\dot{\omega}$ may be the instantaneous angular acceleration of the axle. At the same instantaneous angular acceleration, the maximum applicable force $F_m$ may be obtained in correspondence of the maximum adhesion value μ, e.g., in correspondence with the points lying on the curve A of FIG. 4.

If one decides to slip the axle in conditions corresponding for example to point b in FIG. 4, the value of the force $F_m$ available may be reduced as a result of the reduction of the adhesion value, but an energy injection phenomenon may be obtained at the interface between the wheel and the route surface (e.g., the wheel-surface point of contact) proportional to the slip (difference) between the vehicle speed Vv and the tangential speed Vr of the wheel, with a power (energy injected per unit of time):

$$P(\delta) = F_A(\delta) \cdot (V_v - V_r) = \mu(\delta) \cdot m \cdot g \cdot (V_v - V_r) = \mu(\delta) \cdot m \cdot g \cdot \delta V_v. \quad (5)$$

The expression (5) above may indicate how by increasing δ an increase of the power applied to the wheel-surface point of contact may be obtained. Such injection of energy can cause an overheating of the wheel (e.g., a leading wheel coupled with a leading axle along a direction of travel of the vehicle) with a consequent cleaning effect of the point of contact, improving the instantaneous adhesion value for the next wheel (e.g., a trailing wheel coupled with a trailing axle, traveling over the same portion of the route surface that was traveled by the leading wheel after the leading wheel, and disposed behind the leading wheel and leading axle along a direction of movement of the vehicle). In the case of moisture or rain, significant cleaning effects may be obtained, whereas in the presence of lubricants or rotten leaves, the cleaning effect may be less pronounced.

Some systems for recovering adhesion between the wheels and route surfaces may impose a fixed slip value δ, typically between 0.2 and 0.3, the specific value being calibrated in a definitive way during the vehicle approval tests. The selected value of δ may therefore be optimized or improved for the type of lubricant used to cause the skidding condition during testing, as prescribed for example in EN 15595, 2009+A1, Railway Applications-Braking-Wheel Slide Protection, para. 6.4.2.1. It may therefore not be optimal or desirable for all types of materials that may cause conditions of slipping during the normal service of the vehicle.

Figure 6A:
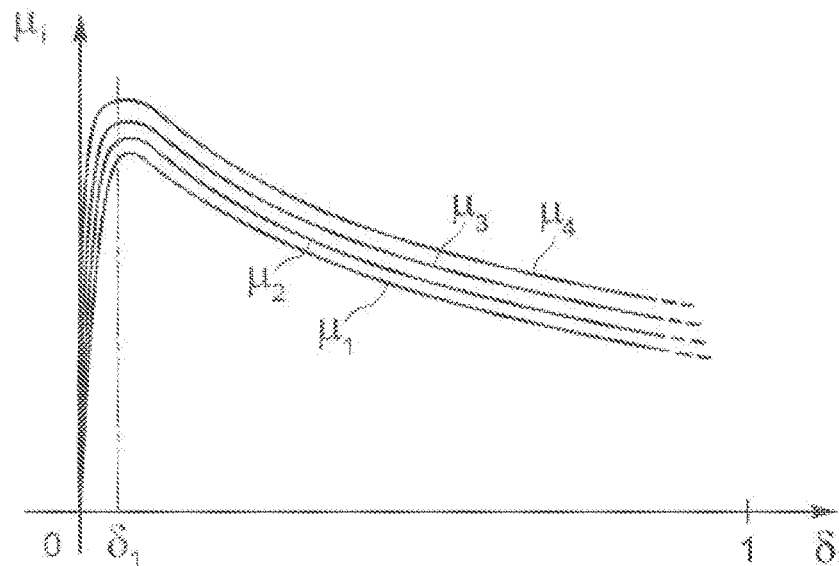
FIGS. 6A, 6B are graphs showing qualitatively the trends of the adhesion coefficient μ of the wheels of four axles of a vehicle in two different operating conditions.

The graph of FIG. 6A shows in a qualitative way how the global adhesion peak of a vehicle with four axles varies according to the change in δ: by bringing all the axles to slide with adhesion corresponding to the value δ1, as in FIG. 6A, there may be practically no cleaning factor, and therefore the four adhesion curves corresponding to the four wheels substantially coincide with each other and each axle takes advantage of the upper limit or maximum adhesion peak value μ(δ$_1$).

Figure 6B:
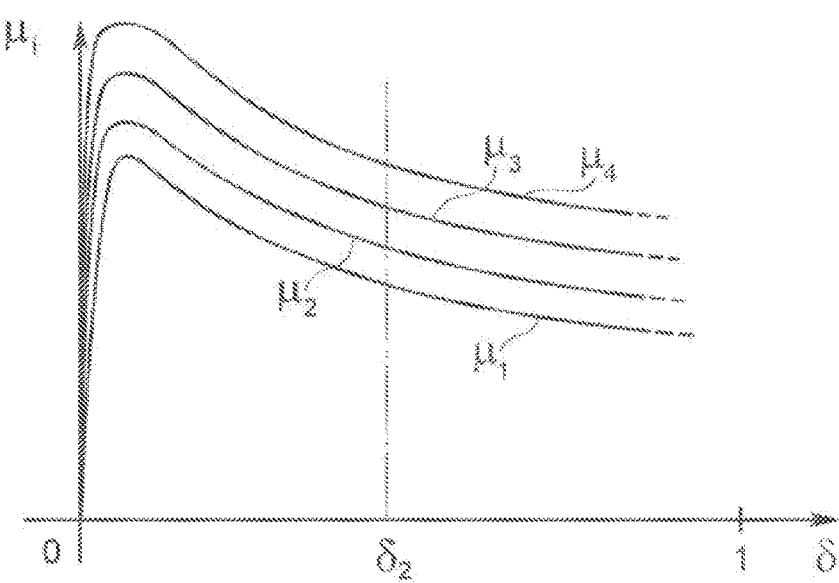

If instead one causes the axles to slide with an adhesion corresponding to the slip δ$_2$ as in FIG. 6B, a high-cleaning factor may be obtained: only the 1 curve corresponding to the first axle of the vehicle (in the direction of travel) may remain the same and equivalent to that of FIG. 6A, while the curves corresponding to subsequent axles may have increasing adhesion values due to the effect of cleaning achieved by the previous axle. The μ(δ$_2$) value for each axle may be lower than the corresponding value of μ(δ$_1$).

Figure 6C:
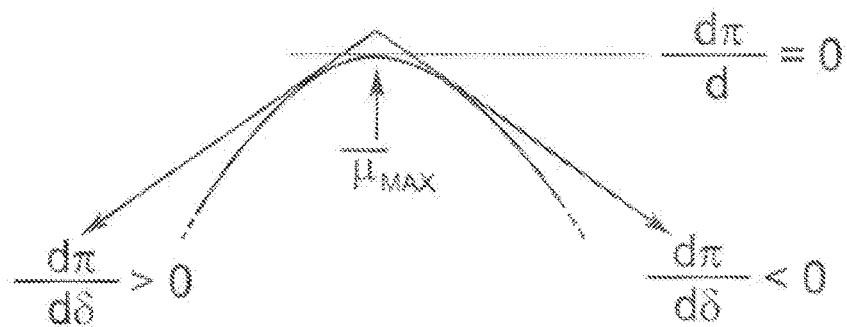
FIG. 6C illustrates the trend of an average adhesion curve μ around the peak value.

As may be qualitatively shown in FIG. 6C, in the range of δ$_1$≤δ≤δ$_2$, a peak value of average global adhesion $\bar{\mu}=\Sigma_1^n \mu(\delta)/n$ (6) exists.

What is described above may apply, by extension, to a vehicle or convoy with n axles. Since the curves which express the adhesion μ according to the slip function δ may not be formulated mathematically in an analytical way and may vary according to the conditions that may cause the skidding, the geometry of the contact point and the external environmental conditions, it may not be possible a priori, to compute analytically the value of δ of optimal or desired slip.

However, a system for controlling and possibly recovering adhesion may be able to analyze the instantaneous adhesion conditions in real time and may verify the trend according to the change in δ and may identify the value of δ such as to maximize or increase:

$$\bar{\mu}=\Sigma_1^n \mu(\delta)/n.$$

This value may be which allows the maximum or larger recovery of adhesion in case of skidding, e.g., the value that may minimize or reduce the stopping distance in the event of braking in a degraded adhesion condition.

To remedy the problems described above, EP 2 147 840 A describes an adaptive control procedure, implemented in discrete mode over time with successive stages, based on the static monitoring of the braking pressure values initially obtained for a δ value equal to 0.7 for a predetermined time, for example 5 seconds. A δ value is then selected from among three possible predetermined values, and this δ value is kept constant at the new value for another predetermined time interval, for example, 10 seconds.

At the end of the total period of 15 seconds, δ is returned to the initial value (0.7) and a new monitoring-decision cycle is started. The method described in this document is relatively simple and poses reduced computational requirements to the system. However, it causes jumps in the slip speed corresponding to the jumps in δ, which are liable to cause instantaneous acceleration swings and a high consumption of compressed air.

Moreover, this method allows one to identify variations of δ in the skidding in a discrete mode over time, with a period equal to 15 seconds. Lower periods can be set, but at the expense of a further increased consumption of compressed air and more frequent swings in the instantaneous acceleration. In addition, the continuous repetition of the process may be useless when the environmental conditions do not change substantially during skidding.

WO 2006/113954 A describes a slip control for railway vehicles, implemented in a continuous manner over time, which requires the identification, in optimal adhesion conditions, of the parameters necessary in view of the subsequent desired performance in skidding conditions. This method further requires the global deceleration of the system to be known.

Furthermore, the process of adjusting the optimum slip values requires significantly long times. As this adjustment process is implemented at the beginning of a skid phase, i.e. when the vehicle is traveling at high speed, the space covered by the latter is increased considerably.

One feature of the present subject matter may provide a method for controlling and possibly recovering the adhesion of the wheels of a controlled axle of a vehicle. The method can include generating speed signals indicative of angular speed(s) of the wheels of at least two axles (which may be controlled axles that may be rotated by an engine, motor, or the like), evaluating instantaneous adhesion at the point(s) of contact between the wheels of at least one axle and the route surface using an adhesion observer, generating a target-slip value for the wheels of at least two axles, to be assigned through a predetermined algorithm, which processes the estimated adhesion values, and modifying the target-slip value repeatedly over time, with a predetermined sampling period, so as to increase the average value of the adhesion of the wheels of the vehicle.

The method according to one embodiment of the inventive subject matter may allow an calculated value of the slip δ(t) to be identified, which may allow the adhesion value obtained as an average value between the instantaneous adhesion of all the axles to be increased or maximized. This average value can be calculated as follows:

$$\bar{\mu}(t) = \Sigma_1^n \mu_n(\delta,t)/n \quad i=1,2,\ldots,n \tag{7}$$

The method can intervene at the beginning of a skidding phase and correct the calculated value of δ(t) in real time (e.g., during movement or skidding of the wheels of the vehicle on the route surface) and may repeatedly (e.g., regularly, intermittently, etc.) over time, adapting the calculated value of δ(t) (e.g., slip as a function of time) to possible variations of the values $\mu_i(\delta,t)$ (adhesions of the i controlled axles) which may intervene in the course of skidding so as to tend to maintain the average value μ(t) in all or many circumstances at the increased or maximum value.

In one example, the optimum or calculated value of the slip δ(t) may be calculated by an AI neural network. The AI neural network may include artificial neurons arranged in layers and connected with each other by connections. The AI neural network may receive feedback regarding the target slip value that may be calculated by the artificial neurons. The AI neural network may be trained by changing one or more connections between the artificial neurons in the AI neural network based on the feedback, as discussed further below.

The method can use an adhesion observer to evaluate in real time the adhesion value μ at the point of contact between the wheels and route surface(s) for one or more axles during a skidding phase and, by processing these μ values in real time, identify repeatedly over time the optimal or defined δ value to be assigned to a slip control system to obtain the greatest or increased global adhesion recovery.

An adhesion observer adapted to dynamically identify the instantaneous value ($T_j$) of the adhesion in a generic sampling period $T_j$ of a predetermined duration T at the wheel-route point of contact during skidding may be definable using the equations provided above, from which with some steps the following relationship may be obtained:

$$\mu(T_j) = \frac{1}{m \cdot g} \cdot [F_m(T_j) + J/R \cdot \omega(T_j)] \tag{8}$$

where $\dot{\omega}$ may be the angular acceleration of the axle (e.g., the time derivative of the angular speed of the axle. The value of this acceleration may be available in real time within a control and adhesion recovery system because angular acceleration may be one of the variables on which the control function implemented by the block CM in FIG. 2 may normally be based for achieving the slip control of the axle. The sign of $\dot{\omega}$ depends on the instantaneous acceleration or deceleration condition of the axle.); m may be the mass on the wheel-route point of contact (in some vehicle systems, the value of m may be known in real time, as this value may already be available to the system that may compute the accelerating/braking force to apply to the axle to obtain the desired accelerations/decelerations); J may be the moment of inertia of the axle and may have a value that may be designated or always known (e.g., supplied by the manufacturer of the carriages and/or otherwise known from the for the computation of stopping distances); $F_m$, already defined above in relation to FIG. 5 (can be obtained by multiplying the pressure applied to a brake cylinder, which may be known to the braking system, for pressure/force conversion coefficients typical of the brake cylinder, as well as the transmission and efficiency coefficients of the levers and of the coefficient of the friction between the brake linings and discs (in the case of disc brakes); in the case of electrodynamic type traction or braking, the value of the force $F_m$ may be obtained from the electric current value supplied/regenerated by the motor in traction or, respectively, in braking; in the case of so-called "blended" braking, the intensity of the force $F_m$ may be determined as the sum of the respective contributions of the pneumatic brake and of the electrodynamic brake, appropriately weighed with respective coefficients); and $T_j$ may be the generic $j^{th}$ value for the sampling period of the system with which the adhesion observer and more generally the method according to one embodiment of the invention; in the description that follows, $T_j$ will replace the use of the variable t representing time.

Downstream of the adhesion observer (via a path that information and/or signals may be communicated), a low-pass type filter can be used to remove or at least mitigate instantaneous or short term variations and noise present outside of the frequency band useful for a correct observation of the adhesion values. A first embodiment of a vehicle control system for implementing a method according to the present subject matter may be illustrated in FIG. 7.

The system and method can identify and track and tracking the slip value δ such that the curve μ(δ) illustrated in FIG. 6C may present an increased or maximum value, such as the value of δ for which:

$$\frac{d\overline{\mu}(T)}{d\delta(T)} = 0$$

For this purpose, a system implementing an LMS algorithm (Least Mean Square) may be used. For an accurate description of the general characteristics of the convergence criteria and the implementation variants of one or more LMS algorithms, please refer to the available literature and in particular to the text: B. Widrow, S. D. Stearns, "Adaptive Signal Processing", New Jersey, Prentice-Hall, Inc., 1985.

Figure 7:
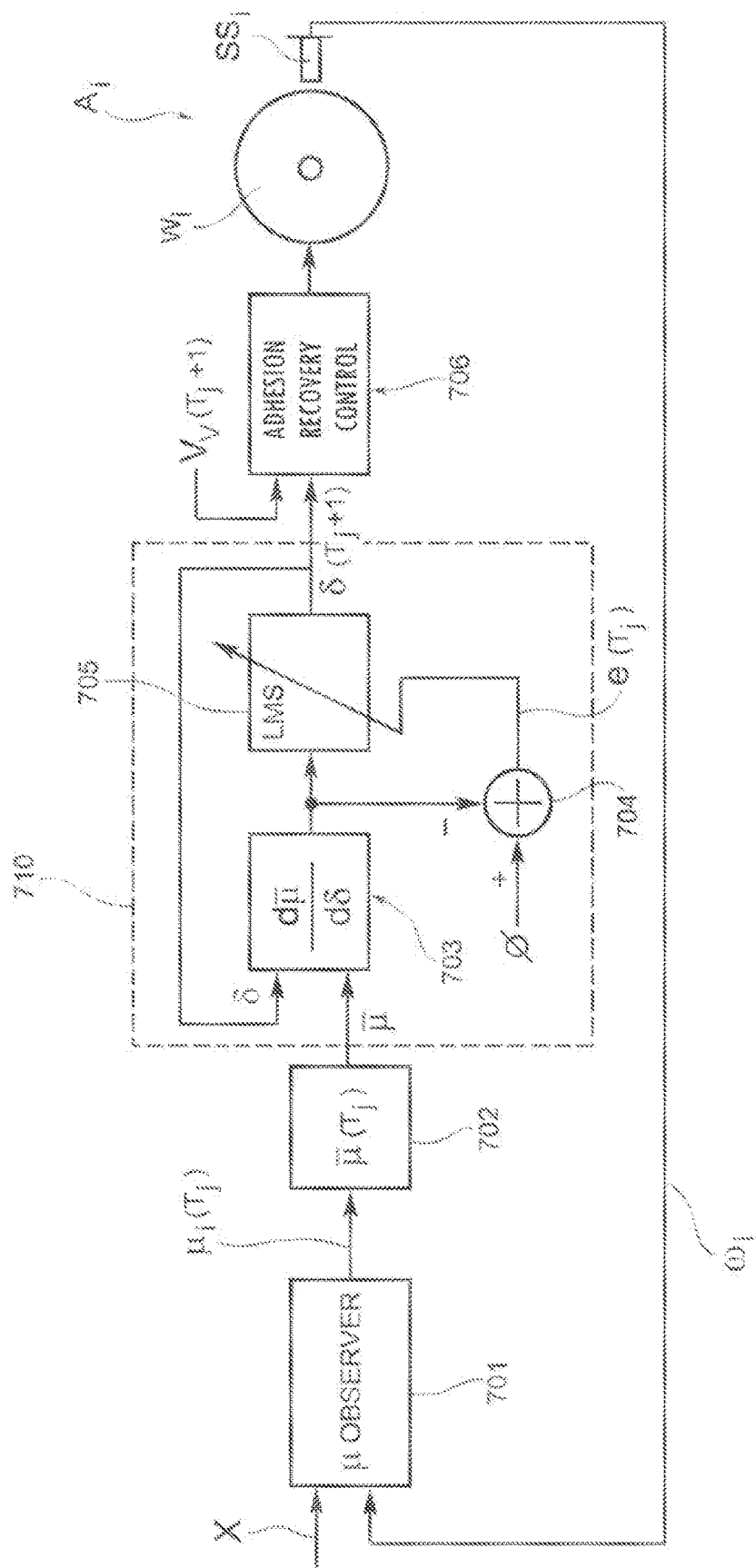
FIG. 7 is a block diagram of a system for implementing a method according to the inventive subject matter.

With reference to FIG. 7, an adhesion observer 701 receives input signals representative of the speed values of $\omega_1, \omega_2, \ldots, \omega_n$ of the wheels $W_1, W_2, \ldots, W_n$ of controlled axles, together with a vector containing the values of the magnitudes $m_i(T_j)$, $J_i$, $R_i$ and $F_{mi}(T_j)$ previously described for the estimation of the instantaneous adhesion values of $\mu_i(T_j)$ relating to the axles $A_i$ (with i=1, 2, . . . , n). The adhesion observer can represent hardware circuitry that includes and/or may be connected with one or more processors (e.g., one or more microprocessors, field programmable gate arrays, integrated circuits, etc.) that perform the operations described herein in connection with the adhesion observer.

The output of the adhesion observer 701 may be connected to the input of a calculation module or device 702 which may compute, based on the estimated instantaneous adhesions values $\mu_i(T)$, the average value $\mu(T_j)$. The modules described herein can represent hardware circuitry that may include and/or may be connected with one or more processors that may perform the operations described herein in connection with the calculation module or device. In one example, the modules described herein can represent hardware circuitry that may include and/or may be connected with an AI neural network that may perform the operations described herein in connection with the calculation module or device. This hardware circuitry and/or processors for each module may be the same or different circuitry and/or processors than the other modules and/or the adhesion observer.

A subsequent differentiator module 703 may compute the value of $$\frac{d\overline{\mu}}{d\delta},$$

for example, according to the equation:

$$\frac{d\overline{\mu}(T_j)}{d\delta(T_j)} = \frac{\overline{\mu}(T_j) - \overline{\mu}(T_{j-1})}{\delta(T_j) - \delta(T_{j-1})} \quad (9)$$

An adder module or device 704 may output the error $e(T_j)$ as the difference between the desired value (0) of the derivative and the instantaneous value corresponding to the equation (9) above. The error may be used to drive and adapt the LMS algorithm implemented in an implementation module 705. This implementation module may output the target value $\delta(T_j+1)$.

The value $\delta(T_j+1)$ may be supplied, together with the updated value of the speed $V_v$ of the vehicle, to a plurality of adhesion recovery control devices 706, one for each axle, each having, for example, the architecture illustrated in FIG. 2 described above. The implementation module that may implement the LMS algorithm may implement the correction of the output (e.g., the δ value, in order to minimize, reduce, or cancel the error e(T), i.e. up to the cancellation of $$\frac{d\overline{\mu}}{d\delta}.$$

Figure 8:
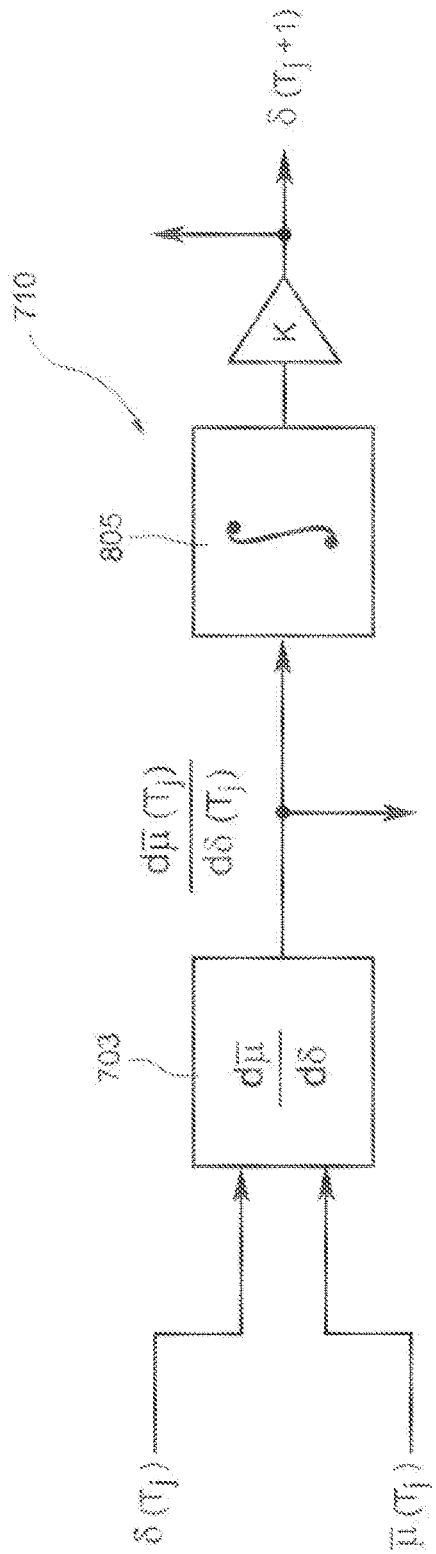
FIGS. 8 and 9 are block diagrams of two alternative embodiments of systems for tracking the average adhesion peak value.

A simplified implementation of the group of modules included in the dashed line block 710 of FIG. 7 may be illustrated in FIG. 8, where the implementation module, which may implement the LMS algorithm, may be replaced with a simple integrator module 805, the output of which, may be amplified with a gain K, may generate the target-slip value $\delta(T_j+1)$ to be assigned to the adhesion control and recovery system (shown in FIG. 7). The gain K may regulate the identification speed of the average adhesion peak value f and can ensure the stability of the closed loop system.

Figure 9:
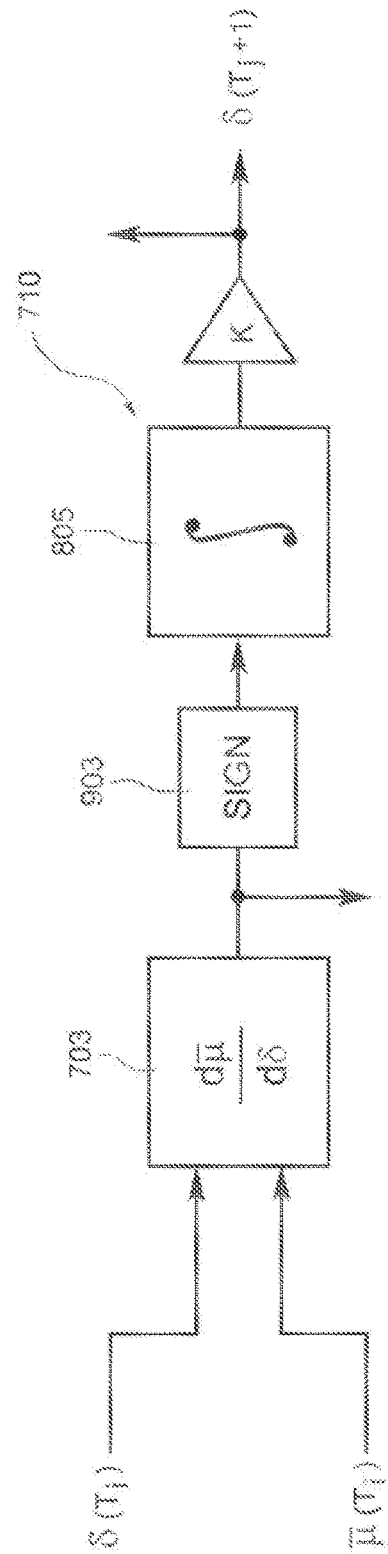

Another variant of embodiment of the dashed block of FIG. 7 may be shown in FIG. 9: a detection module 903 may detect the sign of the derivative $$\frac{d\overline{\mu}}{d\delta}.$$

The output of the module may be equal to +1 or −1 (the positive and, respectively, negative direction), a subsequent integrator module 805 may perform simple unitary sums. The integrator may be replaced with an up/down type counter updated with period $T=T_{j+1}-T_j$.

The diagrams according to FIGS. 8 and 9 may perform a repeated tracking of the average adhesion peak μ, and may repeatedly adapt to the change in adhesion conditions, similarly to what may be achieved with the diagram according to FIG. 7. The latter may allow rapid and accurate tracking of the condition $$\frac{d\overline{\mu}}{d\delta} = 0,$$

but may require the use of a certain number of computations in real time.

The diagram according to FIG. 9 may reduce the number of computations necessary, but also may reduce the speed of tracking the condition $$\frac{d\overline{\mu}}{d\delta} = 0.$$

The diagram according to FIG. 8 may have intermediate characteristics between those of the diagrams according to FIGS. 7 and 9.

Figure 10:
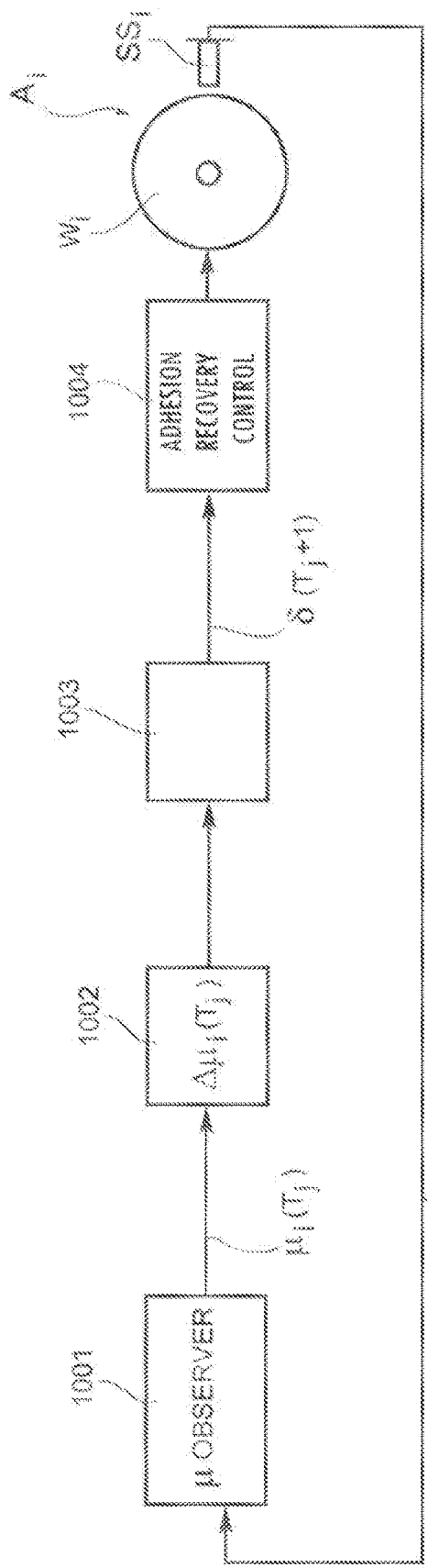
FIG. 10 is a block diagram of another system for implementing a process or method according to the inventive subject matter.

FIG. 10 illustrates a further vehicle control system for the implementation of a method according to the present subject matter, where the difference between the greater and lesser adhesion value between the controlled axles in the generic period $T_j$ may be analyzed in real time:

$$\Delta\mu(T_j)=\mu_{max}(T_j)-\mu_{min}(T_j) \quad (10)$$

and the value $\delta(T_j+1)$ may be obtained based on a curve obtained from experimental data, as described below.

With reference to FIG. 10, an adhesion observer or module 1001, like the observer or module of FIG. 7, may receive the values of the speeds of the wheels of controlled axles, together with a vector of the values of the magnitudes previously described, necessary for the estimation of the corresponding adhesions $\mu_i(T_j)$. A differential module 1002 may receive from the adhesion observer the values of the instantaneous adhesions $\mu_i(T_j)$ and may output the value of $\Delta\mu(T_j)$, according to the equation (10) given above in one example.

A slip calculation module 1003 may subsequently receive the value of $\Delta\mu(T_j)$ as input and may output the value of $\delta(T_j+1)$ to be assigned to the control and adhesion recovery module 1004, like the module of FIG. 7 and may have, for example, the configuration shown in FIG. 2.

The calculation module may have a transfer function with hysteresis according to the graph shown in FIG. 11: this transfer function may define a relationship between the slip $\delta$ and the adhesion variation $\Delta\mu$, the graph of which may have essentially the shape of a polygon, bounded below by a straight horizontal line, $\delta=\delta x$ with $\delta x$ typically (but not necessarily) equal to 0.05 and bounded above by a horizontal straight line, $\delta=\delta y$, with $\delta y$ typically (but not necessarily) equal to 0.35. The transfer function can thus generate $\delta$ values between $\delta x$ and $\delta y$.

If the adhesion control and recovery module 1004 must fully comply with regulatory requirements (EN 15595, 2009+A1, cited above), then the $\delta y$ value may abide by the requirements in paragraph 6.3.2.2 of that standard.

If during a sliding phase for a given $\delta$ value, a reduction of adhesion $\Delta\mu$ may be observed tending to cause the point of work to migrate out horizontally through the left oblique rectilinear side of the aforementioned polygon, the transfer function may determine the new value of $\delta(\Delta\mu)$ descending along this oblique rectilinear side. Similarly, if, during a skidding phase for a given $\delta$ value, there may be an increase of $\Delta\mu$ tending to cause the point of work to migrate out horizontally through the right oblique side of the polygon, the transfer function may determine the new value of $\delta(\Delta\mu)$ rising along the right oblique rectilinear side of the aforementioned polygon.

The hysteresis of the transfer function may be required to provide stability to the system, which otherwise may tend to oscillate due to the significant propagation delay in the loop.

The oblique rectilinear sides of the polygon may converge between them toward the bottom, and may reduce the hysteresis in the vicinity of the origin of the coordinate axes, in order to make the system very sensitive to small variations of $\Delta\mu$ when the system may work in conditions of $\delta \approx \delta x$, as in the situation to which the graph of FIG. 6A refers.

Figure 11:
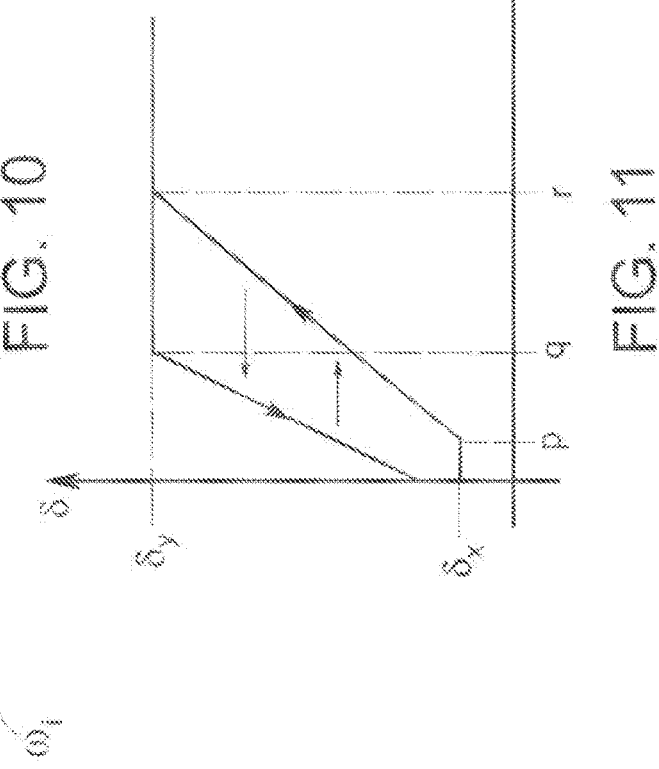
FIG. 11 is a graph of a transfer function with hysteresis used in the implementation of the system and/or method according to the inventive subject matter.

In FIG. 11, the values p, q, r, which represent the x-coordinates of vertices of the aforementioned polygon, may be determined experimentally and may have, for example, approximately the values p=0.01, q=0.03 and r=0.05. The module may compute $\delta(T_j+1)$ with a period T ($=T_{j+1}-T_j$), ensuring an adjustment in time of the $\delta$ value to the environmental conditions.

A further implementation of the method according to the present subject matter may provide for the generation of the value of $\delta(T_j)$ according to a real-time processing of the values of $\mu(T_j)$, $\Delta\mu(T_j)$ and $\delta(T_j)$ by means of a fuzzy logic algorithm, intended to generate the value of $\delta(T_{j+1})$ to be assigned to the adhesion control/recovery module of FIG. 7.

A manner of implementing the method according to the present subject matter described above in skidding phase can force all the controlled axles to slip about the value S. In fact, the last (in the direction of travel) of the controlled axles that may be still in the skidding condition, may no longer have the function of cleaning the route surface (e.g., rails) for any subsequent axles (since it may be the last of the axles, or further subsequent axles being in the condition of complete adhesion) may be held in controlled slipping on the adhesion peak value lying on the curve A of FIG. 4 by further increasing the value of $\mu(T_j)$.

Such action simply may not be done by forcing on the concerned axle a specific value of $\delta$ corresponding to the points of the curve A of FIG. 4, since this curve may be unknown a priori and varies with time.

Figure 12:
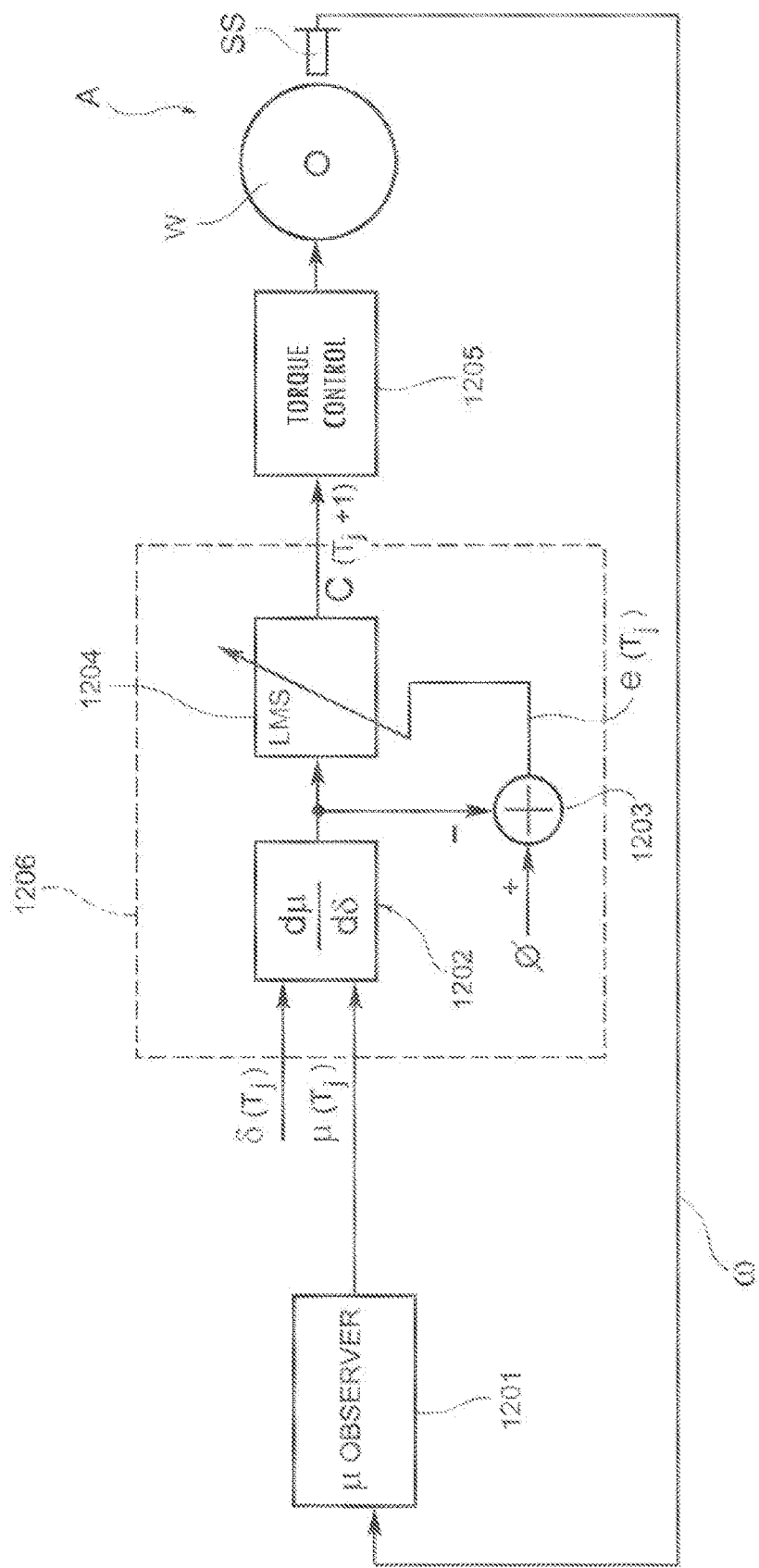
FIG. 12 is a block diagram of a variant of embodiment of a system for implementing a method according to the inventive subject matter.

To maintain this axle in controlled slipping on the adhesion peak value, as may be shown in FIG. 12, an adhesion observer module 1201 may receive signals indicative of the wheel speed of this controlled axle, simultaneously or concurrently with a value vector of the magnitudes, previously described, necessary for estimating the instantaneous adhesion $\mu$ of this axle.

A derivative module 1202 may subsequently compute the value of the derivative $$\frac{d\bar{\mu}}{d\delta},$$

when the value of $\delta$ may be obtained in real time in accordance with the equation (1').

An adder device or module 1203 may output the error $e(T_j)$ as the difference between the desired value of the derivative (i.e., the value 0) and the instantaneous value computed by the module 1202. This error may be used to adapt the LMS algorithm implemented in a block 1204. The latter may output a torque request $C(T_{j+1})$ for the axle, which may be transmitted to a torque control module 1205, having, for example, the architecture described above with reference to FIG. 3.

In one example, the module can repeatedly (e.g., regularly or intermittently) correct the output $C(T_{j+1})$ to minimize, reduce, or cancel the error $e(T)$ (e.g., to obtain a cancellation of the aforementioned derivative, that may be in order to bring the axle to the adhesion peak value and maintain the axle at that value).

The dashed block 1206 of FIG. 12 may possibly be simplified as described above in relation to FIG. 7 and the relative simplifying variants illustrated in FIGS. 8 and 9. The solution according to FIG. 12 may allow the real value of the maximum or larger value available adhesion for a given axle to be measured. By applying this solution to two axles, for example, the first axle in the direction of travel and the last axle in the skidding condition, and finding the difference between their adhesions, the value to be assigned as the difference in adhesion $\Delta\mu$ in the embodiment illustrated in FIG. 10 may be obtained, in substitution of the blocks 1001 and 1002 illustrated herein.

The solution according to FIG. 12 may also be used to identify the direction of travel of the vehicle: at the beginning of a skidding phase, the solution according to FIG. 12 may be applied for example to the first and last axles of the vehicle and the direction of travel may be defined by the axle for which the lower value of adhesion may be detected.

Finally, the solution according to FIG. 12 may be used to improve the estimation of the actual speed $V_v$ of the vehicle. The curve A of FIG. 4 may be located in a field to which correspond the x-axis values δ of less than 0.02. The algorithm most used for the estimation of the actual speed $V_v$ of the vehicle, in the event of braking, may use a function of the type:

$$V_v(T_j) = \max[S_1(T_j), \ldots, S_n(T_j), (V_v(T_{j-1}) + \alpha_{max} \cdot T)] \quad (11)$$

while in the case of traction, the following function can be used:

$$V_v(T_j) = \min[S_1(T_j), \ldots, S_n(T_j), (V_v(T_{j-1}) + \alpha_{max} \cdot T)] \quad (12)$$

where $a_{max}$ can be the maximum (or other designated upper limit) acceleration permitted for the vehicle in operation, this acceleration having a positive sign in the case of a traction condition and a negative sign in the case of a braking condition.

Therefore, applying the solution according to FIG. 12 to at least one axle, the axle may advance at a linear speed equal to that of the vehicle (or less than a maximum error computable as 2%), even in degraded adhesion conditions. Therefore, the above two expressions can allow for a reliable value of the vehicle's speed $V_v$ to be provided, even in very degraded adhesion conditions.

Figure 13:
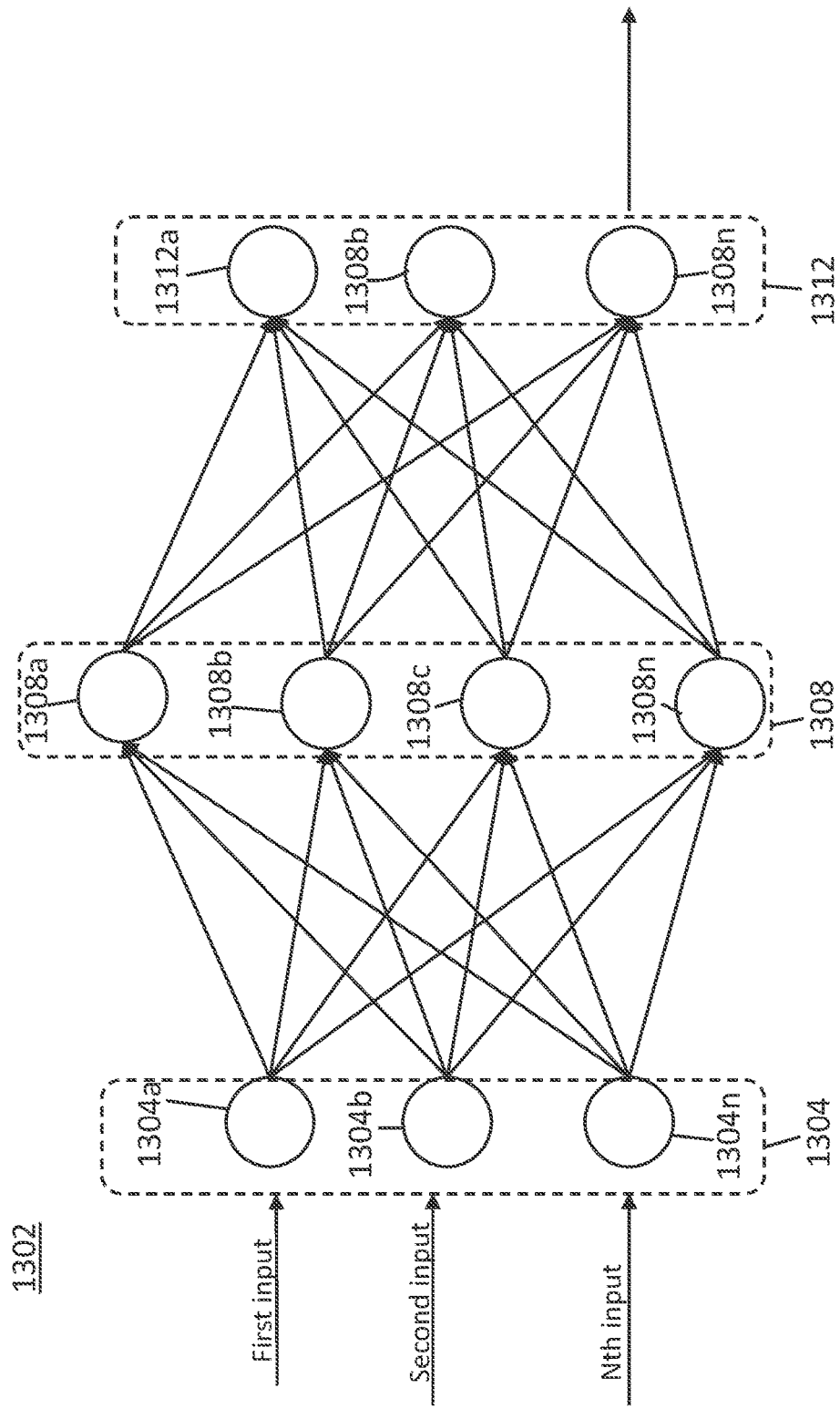
FIG. 13 is a functional block diagram of an example neural network that can be used by a vehicle control system, according to one example.

As previously stated, one or more of the vehicle control systems described herein may be implemented in an AI or machine-learning system. FIG. 13 illustrates a functional block diagram of an example neural network 1302 that can be used by a vehicle control system. The vehicle control system may review various inputs, described above, for example the adhesion value, the derivative of the adhesion value, torque applied to the axles, route conditions, or the like. In an example, the neural network can represent a long short-term memory (LSTM) neural network. In an example, the neural network can represent one or more recurrent neural networks (RNN). The neural network may be used to implement the machine learning as described herein, and various implementations may use other types of machine learning networks. The neural network may include an input layer 1304, one or more intermediate or hidden layers 1308, and an output layer 1312. Each layer includes artificial individual units, or neurons. Each neuron can receive information (e.g., as input into the neural network or as received as output from another neuron in another layer or the same layer), process this information to generate output, and provide the output to another neuron or as output of the neural network. The input layer may include several input neurons 1304a, 1304b . . . 1304n. The hidden layer may include several intermediate neurons 1308a, 1308b . . . 1308n. The output layer may include several output neurons outputs 1312a, 1312b . . . 1312n. The inputs may include, for example, vehicle weight, pneumatic pressure, switch status, or the like.

Each neuron can receive an input from another neuron and output a value to the corresponding output to another neuron (e.g., in the output layer or another layer). For example, the intermediate neuron 1308a can receive an input from the input neuron 1304a and output a value to the output neuron 1312a. Each neuron may receive an output of a previous neuron as an input. For example, the intermediate neuron 1308b may receive input from the input neuron 1304b and the output neuron 1312a. The outputs of the neurons may be fed forward to another neuron in the same or different intermediate layer.

The processing performed by the neurons may vary based on the neuron, but can include the application of the various rules or criteria described herein to partially or entirely decide one or more aspects of the braking system, for example when to enable or release pressure in the volume or chamber, when to energize or deenergize the solenoids, when to open or close the one or more switches or the like. The output of the application of the rule or criteria can be passed to another neuron as input to that neuron. One or more neurons in the intermediate and/or output layers can determine matches between one or more aspects of the vehicle control system, for example that the target slip value for a determined adhesion value. As used herein, a "match" may refer to a preferred operation of the vehicle control system based on the inputs, for example a preferred target slip value. The preferred operation may be based on increasing performance, efficiency, safety, longevity, or a combination of any or all of these factors. The last output neuron 1312n in the output layer may output a match or no-match decision. For example, the output from the neural network may be an that the target slip value needs to be increased a given adhesion value and route condition. Although the input layer, the intermediate layer(s), and the output layer may be depicted as each including three artificial neurons, one or more of these layers may contain more or fewer artificial neurons. The neurons can include or apply one or more adjustable parameters, weights, rules, criteria, or the like, as described herein, to perform the processing by that neuron.

In various implementations, the layers of the neural network may include the same number of artificial neurons as each of the other layers of the neural network. For example, the adhesion value, the torque applied to the axles, the target slip value, or the like may be processed to provide information to the input neurons 1304a-1304n. The output of the neural network may represent a match or no-match of the inputs to the a given output. More specifically, the inputs can include historical vehicle data. The historical vehicle data can be provided to the neurons 1308a-1308n for analysis and matches between the historical vehicle data. The neurons 1308a-1308n, upon finding matches, may provide the potential matches as outputs to the output layer, which can determine a match, no match, or a probability of a match.

In some embodiments, the neural network may be a convolutional neural network. The convolutional neural network can include an input layer, one or more hidden or intermediate layers, and an output layer. In a convolutional neural network, however, the output layer may include one fewer output neuron than the number of neurons in the intermediate layer(s), and each neuron may be connected to each output neuron. Additionally, each input neuron in the input layer may be connected to each neuron in the hidden or intermediate layer(s).

Such a neural network-based vehicle control system can be trained by operators, automatically self-trained by the vehicle control system itself, or can be trained both by operators and by the vehicle control system itself to improve how the system operates.

In one embodiment, the vehicle control system may have a local data collection system deployed that may use machine learning to enable derivation-based learning outcomes. The processors may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the vehicle control system may include a policy engine that may apply one or more policies. These policies may be based at least in part on characteristics of a given item of equipment or environment. With respect to control policies, a neural network can receive input of a number of environmental and task-related parameters. These parameters may include a determined adhesion value, a torque applied to axles, and data from various sensors. The neural network can be trained to generate an output based on these inputs, with the output representing a target slip value to accomplish a vehicle control target. During operation of one embodiment, a determination can occur by processing the inputs through the parameters of the neural network to generate a value at the output node designating that action as the desired action. This action may translate into a signal that causes the vehicle to operate with the target slip value. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The processors can use this artificial intelligence or machine learning to receive input (e.g., an adhesion value), use a model that associates adhesion value with different target slip values to select a target slip value and then provide an output (e.g., the target slip value). The processors may receive additional input of the change in target slip value that was selected, such as analysis of noise or interference in input signals (or a lack thereof), operator input, or the like, that indicates whether the machine-selected target slip value provided a desirable outcome or not. Based on this additional input, the processors can change the model, such as by changing which target slip value would be selected when a similar or identical adhesion value is received the next time or iteration. The processor can then use the changed or updated model again to select a target slip value, receive feedback on the selected target slip value, change or update the model again, etc., in additional iterations to repeatedly improve or change the model using artificial intelligence or machine learning.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The vehicle control system can control the adhesion of the wheels to the route surface using the target slip values that are determined (e.g., in real time, or as the vehicle moves along the route). The ECU of the vehicle control system can determine the angular speeds of the wheels, determine the instantaneous adhesion of the wheels to the route surface, generate a target slip value, and then control the torque applied to the wheels via the axles (e.g., by an engine and/or motor) based on the target slip value to increase or maximize adhesion of the wheels to the route surface. For example, as the target slip value decreases for a wheel or axle, the ECU can automatically decrease the torque applied to the wheel(s) coupled with that axle. As another example, as the target slip value increases for a wheel or axle, the ECU can automatically increase the torque applied to the wheel(s) coupled with that axle.

In one embodiment, a vehicle control system may be provided for controlling adhesion of wheels to a route surface. The control system may include one or more processors configured to determine adhesion values representative of adhesion between the wheels of a vehicle and the route surface based on angular speeds of the wheels. The system may include an artificial intelligence (AI) neural network that may have artificial neurons arranged in layers and connected with each other by connections. The AI neural network may subsequently calculate a target slip value for the wheels that may be coupled with at least two different axles of the vehicle by using the adhesion values that were determined. The AI neural network may repeatedly modify the target slip value to increase an average value of the adhesion values of the wheels. The one or more processors may control a torque applied to at least one of the axles based on the target slip value that may be calculated. The AI neural network may receive feedback regarding the target slip value that may be calculated and modified by the artificial neurons. The AI neural network may be trained by changing one or more connections between the artificial neurons in the AI neural network based on the feedback that may be received.

The AI neural network may reduce a derivative of an average value of the adhesion values with respect to the target slip value by changing the torque applied to the at least one of the axles. The AI neural network may determine an integral of the derivative of the average value of the adhesion values with respect to the target slip value, the AI neural network may determine or change the target slip value based on the integral that may be determined.

The at least two different axles include a leading axle and a trailing axle along a direction of movement of the vehicle. The AI neural network may increase the target slip value associated with the leading axle to clean the route surface with at least one of the wheels coupled with the leading axle prior to travel of at least another one of the wheels that may be coupled with the trailing axle.

The AI neural network may increase the adhesion value for the at least another one of the wheels by increasing the target slip value associated with the leading axle. The AI neural network may repeatedly change the torque applied to the at least one of the axles based on the target slip value that changes. The AI neural network may determine an average value of the adhesion between the wheels and the route surface using the adhesion values.

In one embodiment, a method for controlling adhesion of wheels of a vehicle may include determining adhesion values representative of adhesion between wheels of a vehicle and a route surface based on angular speeds of the wheels and determining a target slip value for the wheels that may be coupled with at least two different axles of the vehicle. The target slip value may be determined based on the adhesion values that may be determined. The target slip value may be calculated using an artificial intelligence (AI) neural network having artificial neuron arranged in layers and connected with each other by connections. The method also may include controlling a torque applied to at least one of the axles based on the target slip value and changing the target slip value as the vehicle moves based on changes in the adhesion values to increase an average value of the adhesion values. The changing of the target slip values may be done using the AI neural network. The method may include receiving feedback regarding the target slip value that may be calculated and changed by the artificial neurons and training the AI neural network by changing one or more connections between the artificial neurons in the AI neural network based on the feedback that may be received.

The method may include reducing a derivative of an average value of the adhesion value with respect to the target slip value by changing the torque applied to the at least one of the axles. The method may include determining an integral of the derivative of the average value of the adhesion value with respect to the target slip value. The target slip value can be changed based on the integral that may be determined.

The at least two different axles may include a leading axle and a trailing axle along a direction of movement of the vehicle. Changing the target slip value can include increasing the target slip value associated with the leading axle to clean the route surface with at least one of the wheels coupled with the leading axle prior to travel of at least another one of the wheels that may be coupled with the trailing axle.

The method may include increasing the adhesion value for the at least another one of the wheels by increasing the target slip value associated with the leading axle. Controlling the torque may include repeatedly changing the torque applied to the at least one of the axles based on the target slip value that changes. The adhesion value may be determined as an average value of the adhesion between the wheels and the route surface as the adhesion value.

In one embodiment, a system for controlling adhesion of wheels of a vehicle may include one or more processors configured to determine adhesion values representative of adhesion between wheels of a vehicle and a route surface based on angular speeds of the wheels. The system may include an artificial intelligence (AI) neural network having artificial neurons arranged in layers and connected with each other by connections. The AI neural network may calculate a target slip value for the wheels that may be coupled with at least two different axle of the vehicle using the adhesion values that were determined. The AI neural network may repeatedly change the target slip value as the vehicle moves based on changes in the adhesion values to increase an average value of the adhesion value. The artificial neurons may receive feedback regarding the target slip value that may be calculated and the AI neural network may be trained by changing one or more connections between the artificial neurons in the AI neural network based on the feedback that may be received. The one or more processors may control a torque applied to at least one of the axles based on the target slip value and may change the target slip value as the vehicle moves based on changes in the adhesion values to increase an average value of the adhesion values. The wheels may include a leading wheel and a trailing wheel along a direction of movement of the vehicle. The AI neural network may increase the target slip value associated with the leading wheel to clean the route surface with the leading wheel prior to travel of the trailing wheel.

The AI neural network may control and change the torque applied to the at least one of the axles to reduce a derivative of the average value of the adhesion values with respect to the target slip value. The AI neural network may determine an integral of the derivative of the average value of the adhesion values with respect to the target slip value. The AI neural network may determine or change the target slip value based on the integral that may be determined.

The AI neural network may increase the adhesion value for the trailing by increasing the target slip value associated with the leading wheel. the AI neural network may repeatedly change the torque applied to the at least one of the axles based on the target slip value that changes. The system may include a low-pass filter that may reduce noise present outside a useful frequency band when determining the adhesion value.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system comprising:
   one or more processors configured to determine adhesion values representative of adhesion between wheels of a vehicle and a route surface based on angular speeds of the wheels,
   an artificial intelligence (AI) neural network having artificial neurons arranged in layers and connected with each other by connections, the AI neural network configured to subsequently calculate a target slip value for the wheels that are coupled with at least two different axles of the vehicle using the adhesion values that were determined, the AI neural network also configured to repeatedly modify the target slip value to increase an average value of the adhesion values of the wheels,
   the one or more processors configured to control a torque applied to at least one of the axles based on the target slip value that is calculated,
   the AI neural network configured to receive feedback regarding the target slip value that is calculated and modified by the artificial neurons,
   the AI neural network configured to be trained by changing one or more connections between the artificial neurons in the AI neural network based on the feedback that is received.

2. The vehicle control system of claim 1, wherein the AI neural network are configured to reduce a derivative of the average adhesion value with respect to the target slip value by changing the torque applied to the at least one of the axles.

3. The vehicle control system of claim 2, wherein the AI neural network are configured to determine an integral of the derivative of the average value of the adhesion values with respect to the target slip value, the AI neural network configured to determine or change the target slip value based on the integral that is determined.

4. The vehicle control system of claim 1, wherein the at least two different axles include a leading axle and a trailing axle along a direction of movement of the vehicle, the AI neural network are configured to increase the target slip value associated with the leading axle to clean the mute surface with at least one of the wheels coupled with the leading axle prior to travel of at least another one of the wheels that is coupled with the trailing axle.

5. The vehicle control system of claim 4, wherein the AI neural network are configured to increase the adhesion value for the at least another one of the wheels by increasing the target slip value associated with the leading axle.

6. The vehicle control system of claim 1, wherein the AI neural network are configured to repeatedly change the torque applied to the at least one of the axles based on the target slip value that changes.

7. The vehicle control system of claim 1, wherein the AI neural network are configured to determine an average value of the adhesion between the wheels and the mute surface using the adhesion values.

8. A method comprising:
Determining, using one or more processors, adhesion values representative of adhesion between wheels of a vehicle and a mute surface based on angular speeds of the wheels;
calculating a target slip value for the wheels that are coupled with at least two different axles of the vehicle, the target slip value calculated using the adhesion values that were determined;
calculating the target slip value using an artificial intelligence (AI) neural network having artificial neurons arranged in layers and connected with each other by connections;
controlling, using the one or more processors, a torque applied to at least one of the axles based on the target slip value;
repeatedly changing the target slip value as the vehicle moves based on changes in the adhesion values to increase an average value of the adhesion values, changing the target slip values using the AI neural network;
receiving feedback regarding the target slip value that is calculated and changed by the artificial neurons; and
training the AI neural network by changing one or more connections between the artificial neurons in the AI neural network based on the feedback that is received.

9. The method of claim 8, further comprising reducing a derivative of an average value of the adhesion value with respect to the target slip value by changing the torque applied to the at least one of the axles.

10. The method of claim 9, further comprising:
determining an integral of the derivative of the average value of the adhesion value with respect to the target slip value, wherein the target slip value is changed based on the integral that is determined.

11. The method of claim 8, wherein the at least two different axles include a leading axle and a trailing axle along a direction of movement of the vehicle, and changing the target slip value includes increasing the target slip value associated with the leading axle to clean the mute surface with at least one of the wheels coupled with the leading axle prior to travel of at least another one of the wheels that is coupled with the trailing axle.

12. The method of claim 11, further comprising:
increasing the adhesion value for the at least another one of the wheels by increasing the target slip value associated with the leading axle.

13. The method of claim 8, wherein controlling the torque includes repeatedly changing the torque applied to the at least one of the axles based on the target slip value that changes.

14. The method of claim 8, wherein the adhesion value is determined as an average value of the adhesion between the wheels and the mute surface as the adhesion value.

15. A system comprising:
one or more processors configured to determine adhesion values representative of adhesion between wheels of a vehicle and a mute surface based on angular speeds of the wheels,
an artificial intelligence (AI) neural network having artificial neurons arranged in layers and connected with each other by connections configured to calculate a target slip value for the wheels that are coupled with at least two different axles of the vehicle using the adhesion values that were determined,
are the AI neural network configured to repeatedly change the target slip value as the vehicle moves based on changes in the adhesion values to increase an average value of the adhesion value,
the artificial neurons configured to receive feedback regarding the target slip value that is calculated,
the AI neural network configured to be trained by changing one or more connections between the artificial neurons in the AI neural network based on the feedback that is received,
the one or more processors configured to control a torque applied to at least one of the axles based on the target slip value,
wherein the wheels include a leading wheel and a trailing wheel along a direction of movement of the vehicle, the AI neural network configured to increase the target slip value that is calculated associated with the leading wheel to clean the route surface with the leading wheel prior to travel of the trailing wheel.

16. The system of claim 15, wherein the AI neural network are configured reduce a derivative of the average value of the adhesion values with respect to the target slip value by changing the torque applied to the at least one of the axles.

17. The system of claim 16, wherein the AI neural network are configured to determine an integral of the derivative of the average value of the adhesion values with respect to the target slip value, the AI neural network configured to determine or change the target slip value based on the integral that is determined.

18. The system of claim 15, wherein the AI neural network are configured to increase the adhesion value for the trailing by increasing the target slip value associated with the leading wheel.

19. The system of claim 15, wherein the AI neural network also are configured to repeatedly change the torque applied to the at least one of the axles based on the target slip value that changes.

20. The system of claim 15, further comprising a low-pass filter configured to reduce noise present outside a useful frequency band when determining the adhesion value.

* * * * *